M. KOCISKO.
ADJUSTABLE LEVEL.
APPLICATION FILED MAY 12, 1916.
1,215,035.
Patented Feb. 6, 1917.
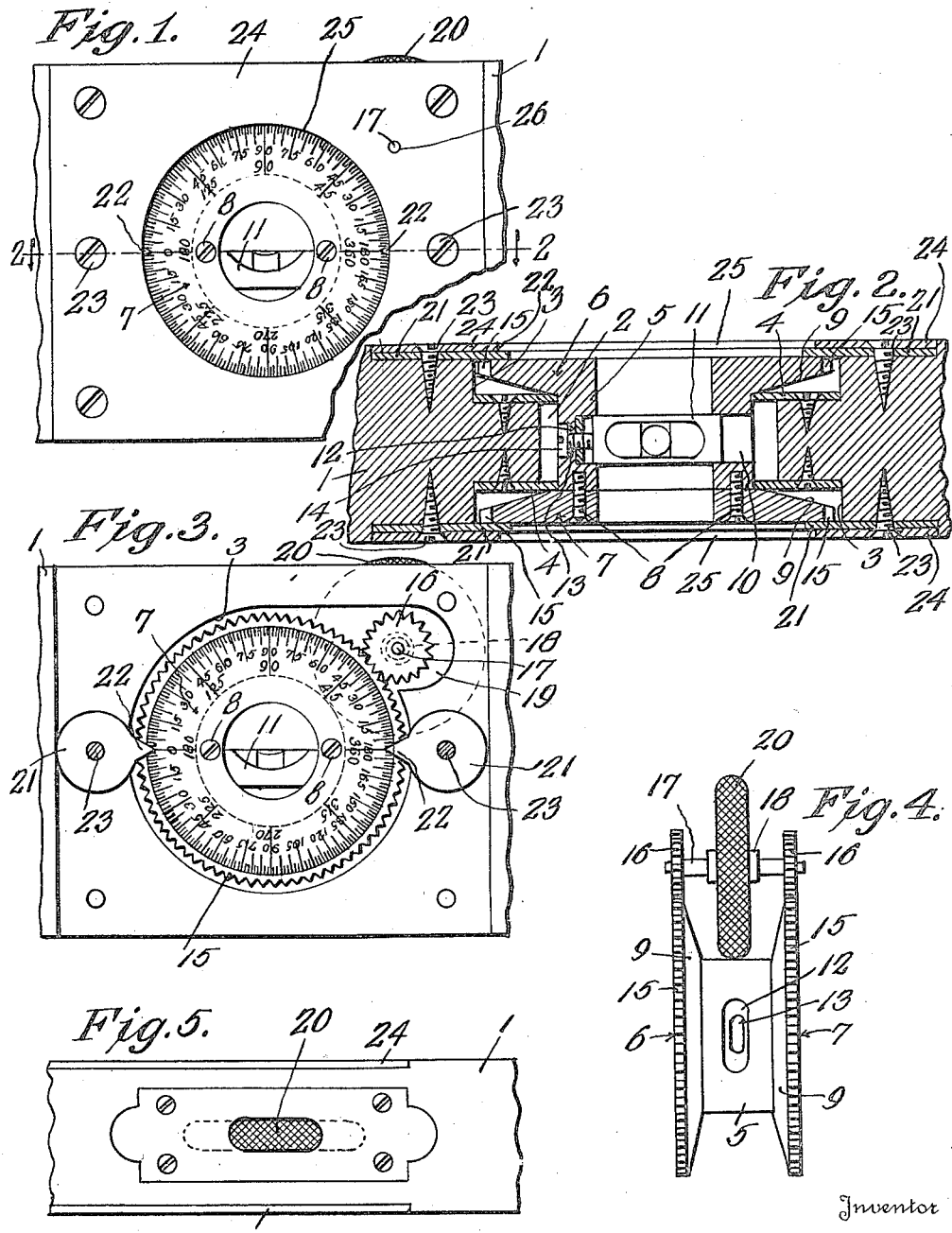
Witnesses
James F. Crown,
Irwin Cosgrove.
Inventor
M. Kocisko,
By 
Attorneys

UNITED STATES PATENT OFFICE.

MICHAEL KOCISKO, OF ANGUS, MINNESOTA, ASSIGNOR TO OSCAR MYHRAN, OF BARTON, NORTH DAKOTA.

ADJUSTABLE LEVEL.

1,215,035. Specification of Letters Patent. Patented Feb. 6, 1917.

Application filed May 12, 1916. Serial No. 97,107.

*To all whom it may concern:*

Be it known that I, MICHAEL KOCISKO, a citizen of the United States, residing at Angus, in the county of Polk, State of Minnesota, have invented certain new and useful Improvements in Adjustable Levels; and I do hereby declare the following to be a full, clear, and exact description of the invention, such as will enable others skilled in the art to which it appertains to make and use the same.

This invention relates to adjustable levels, and has particular reference to a builder's spirit level in which the level member is adjustable relative to the straight edge.

The primary object of my invention is to provide a spirit level which may be readily adjusted to various angles in order to permit the use of the level in making measurements and taking angles in stair and roof building or in any other structural work where angular cuttings are to be made, or structural elements are to be put up.

A further object of the invention, is to provide a spirit level construction of the type above mentioned which may be satisfactorily manufactured within reasonable limits of cost and number of parts.

With the above and other objects in view, as will hereinafter appear, my invention will now be fully set forth and described, reference being had to the accompanying drawings.

In said drawings, Figure 1 is a side elevation of the device as applied to a builder's level, Fig. 2 is a section on line 2—2 of Fig. 1, Fig. 3 is a side elevation of the device with the face plate removed, Fig. 4 is a detail view showing a mechanism for operating the level device, and Fig. 5 is a plan view of the upper edge of the level, showing the thumb wheel for setting the level.
Referring more particularly to said drawings 1 denotes a level body, having the central cavity 2 formed entirely therethrough, said cavity being of sufficient diameter to receive, for rotary movement, the level construction hereinafter described.

The opposite faces of the body 1, surrounding the cavity are countersunk as at 3 to provide seats for a pair of annular bearing plates 4. Said plates 4 rest against and are secured to the bottoms of the countersinks 3, and are of suitable thickness to permit their interior annular edges to act as bearing surfaces for the rotary body constituting the level support. The plates 4 extend inwardly a short distance beyond the cavity or opening 2, so that the bearing edges thereof will lie wholly free of the wall of the cavity 2. Rotatably mounted within the cavity 2, and riding upon the inner annular edges of the bearing plates 4 is a housing 5, said housing 5 consisting of a tubular member 6, and a plate member 7, the latter being secured to the tubular member 6 by means of screws 8. The tubular member 6 is a cylindrical body which extends through, and has bearings upon the inner edges of the two bearing plates 4, and is provided at one end with an annular flange 9, said flange being wholly disposed within one of the countersinks in the body 1. The opposite end of the tubular member 6 is faced to receive the plate member 7 which is an annulus, corresponding in shape and size to the flange 9 formed upon the opposite end of the tubular member 6. The flange 9 and the plate 7 have their inner faces inclined so that their free edges are of reduced thickness, and there is no frictional contact between the faces of the bearing plates 4 and the inner faces of the flange 9 of the plate 7. Furthermore, the internal cavity through the member 6 and the opening through the annulus or plate 7 are of the same diameter, so that a continuous cylindrical opening is provided through the rotary drum or carrier formed by the elements 6 and 7. Diametrically through the cylindrical portion of the tubular member 6, the latter is provided with a bore 10, into which is inserted a spirit level tube 11. The bore 10 does not pass entirely through the member 6, but terminates at one end behind a wall 12 and is widened circumferentially of the tubular member 6 behind said wall to permit the end of the level to swing therein. The wall 12 is slotted as at 13 (Fig. 4) to permit the adjustment of the level tube relative to the member 6 and screw 14 being passed through the slot 13, and being threaded into the adjacent end of the level tube 11. The outer surface of the tubular member 6, immediately surrounding the slot 13, is countersunk to accommodate the head of the screw 14. The circumferential edges of the flange 9 and the plate 7 provided with gear teeth 15, which are adapted to mesh with correspondingly toothed pinions 16 mounted upon opposite ends of a shaft 17, said shaft 17 being mounted in a bearing bushing 18 extended through the body 1, said pinion 16 lying within recesses 19 which extend to one side of the countersinks 3, so that the pinions may be properly positioned to mesh with the gear teeth 15.

As shown in Figs. 4 and 5, the shaft 17 is provided at its middle point with a thumb wheel 20 which rests in a recess in the body 1, and is of sufficient diameter to project a short distance above the upper edge of the latter so that the operator may rotate the thumb wheel. By the above arrangement, the level supporting element may be rotated to bring it into the desired adjusted position.

The outer faces of the flange 9 and the plate 7 are suitably graduated to indicate the angular adjustments for which the level might be set, and at diametrically opposite points on the longitudinal axis of the body 1, the indicating pointers 21 are secured to the body, said indicating pointers consisting of metallic disks having index points 22 formed at one side. The pointers 21 are secured to the body 1 by screws 23 passed through their centers, and by loosening the screws the pointers may be accurately adjusted for the zero line. Covering the leveling device upon opposite faces of the body 1 are the faced plates 24, which, in external contour may have any desired form, but which preferably are of such rectangular shape as to conform in width to the body 1, and are provided centrally with the circular openings 25 through which the level device is visible. Said plates 24 also provide bearings 26 for the extreme ends of the shaft 17, as best seen in Fig. 1.

In the operation of my improved device, as is evident from the foregoing, the level carrying structure is adjusted by means of the thumb wheel 20, the level body first being placed upon a surface whose inclination it is desired to ascertain, and the bubble in the level tube being then brought to the center of the level tube by rotating the level carrying structure and the inclination then being readable at the pointers 21. In the reverse order, if it is desired to locate an element or a surface at any predetermined inclination, the level may be set by rotating the level carrying body as indicated, until the proper angle on the face plates is brought opposite the indicating pointers 21, after which the level may be used in the well known manner.

From the foregoing description it will be evident that I have provided a simple and durable level supporting structure which is readily adjustable to carry out any of the well known functions which ordinarily require the use of a number of separate instruments, and that by the use of my improved device, the number of operations in building construction may be carried out, in a workmanlike manner.

What is claimed is:—

1. An adjustable spirit level comprising in combination, a rotary body consisting of a tubular element, flanges rising from the ends of said tubular element, bearing plates extending between the flanges and carrying the tubular member, a level tube mounted transversely within said tubular element, and means operating on said flanges for rotating said tubular element.

2. An adjustable spirit level comprising in combination, a rotary body, a level tube supported in said body, flanges rising from opposite ends of said body, bearing plates located behind said flanges and supporting said body for rotation, one of said flanges being removable from the body to permit the insertion of the body through the bearing plate, and means operating on said flanges for rotating said body.

3. An adjustable spirit level comprising in combination, a rotary body consisting of a tubular portion, a flange rising from one end of said tubular portion, a pair of bearing plates rotatably supporting said body, an annular plate secured to the free end of said tubular portion and securing the latter in position within said bearing plates, a level tube mounted transversely through said tubular portion, means for adjusting said level tube within said tubular portion, a shaft mounted adjacent said body, pinions carried by said shaft and operating on the edges of said flange and said plate, and a thumb wheel for rotating said shaft.

In testimony whereof I affix my signature, in the presence of two witnesses.

MIKE KOCISKO.

Witnesses:
 JOHN ZIPOY,
 WM. STINOR.

Copies of this patent may be obtained for five cents each, by addressing the "Commissioner of Patents, Washington, D. C."